United States Patent Office 3,002,365
Patented Oct. 3, 1961

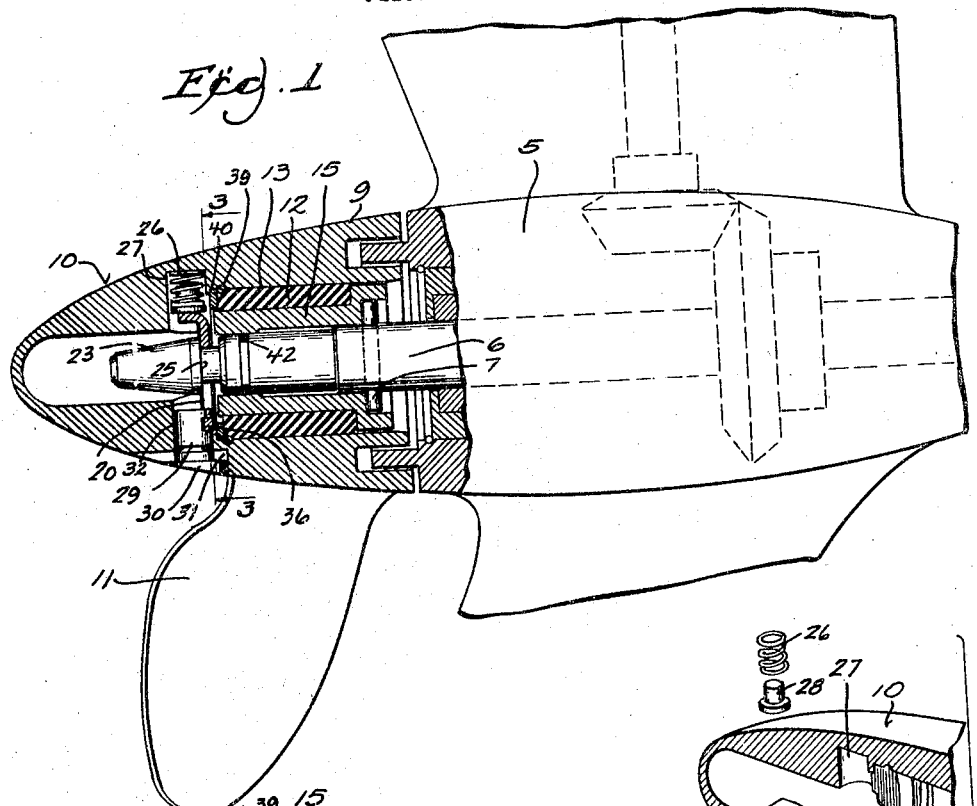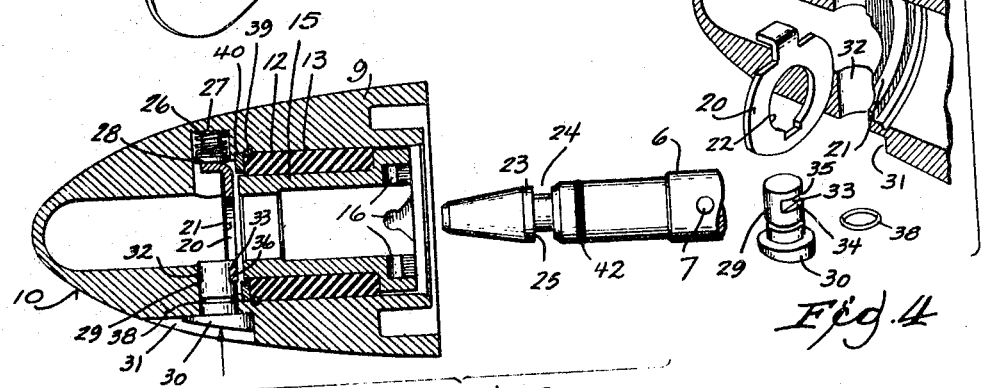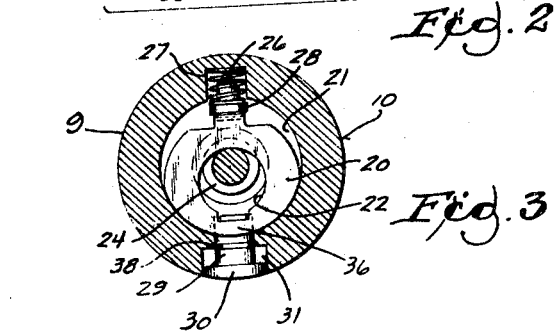

3,002,365
QUICK CHANGE MARINE PROPELLER
Jon L. Liljequist, Mount Prospect, Ill., assignor to Outboard Marine Corporation, Waukegan, Ill., a corporation of Delaware
Filed Mar. 9, 1960, Ser. No. 13,744
10 Claims. (Cl. 64—27)

This invention relates to a quick change marine propeller.

A propeller embodying the invention has all conventional advantages from the standpoint of overload release and yet is so mounted on the shaft by means of a push button-operated key that by simply pressing the button, the operator can withdraw the entire propeller, including its mounting sleeve and release mechanism, unitarily from the drive shaft either for repair or for the substitution of a propeller having different pitch characteristics.

The mounting sleeve is located within that portion of the propeller hub to which the blades are attached, and its forward end is notched to receive a shear pin fixed transversely in the drive shaft. An elastomeric coupling tube encircles the mounting sleeve and is confined under pressure between the mounting sleeve of the propeller hub as a means of providing yieldable friction drive between the mounting sleeve and the hub. Normally this friction drive permits limited relative rotation of the propeller with respect to the drive shaft to accommodate momentary overload, but the shear pin will break in the event of excessive overload.

The drive shaft continues beyond the end of the mounting sleeve and is peripherally grooved to receive the locking key above referred to. This key extends around the groove and is biased so that the inner periphery of the key is normally engaged in the groove. However, the opening provided in the key is sufficiently large to permit the shaft to be withdrawn whenever the key is shifted transversely of the shaft to free its inner margin from the groove. A push button projects to a position where it is accessible from the outside of the hub as a means of displacing the key when it is desired to withdraw the propeller assembly from the shaft.

In the drawings:

FIG. 1 is a view partially in side elevation and partially in axial section showing the propeller assembly mounted on the drive shaft of an outboard motor.

FIG. 2 is a detail view partially in section and partially in side elevation showing the propeller assembly disassociated from the fragmentarily illustrated drive shaft.

FIG. 3 is a view on an enlarged scale taken in section on the line 3—3 of FIG. 1.

FIG. 4 is a fragmentary view in perspective showing a portion of the propeller hub in section and showing in relatively disassociated positions the component parts of the retainer key and its actuating connections.

It is, of course, unnecessary to the invention that it be used solely with an outboard motor, the illustration of the gear housing 5 of an outboard motor being solely for exemplification. Projecting from the gear housing is a portion of the propeller shaft 6 which has a transverse shear pin 7 mounted therein. The hub portion 9 of propeller 10 carries the propeller blades 11 and has the elastomeric annular cushion 12 confined under pressure in the hub cavity 13 between the hub 9 and the mounting sleeve 15.

The forward end of the mounting sleeve is radially grooved to engage the shear pin 7 for transmitting motion from the propeller shaft to the propeller through the mounting sleeve 15, the elastomeric annular cushion 12, and the propeller hub 9. Minor displacement of the propeller with respect to the shaft, such as is caused by momentary contact with a submerged obstacle, will be accommodated either by the torsional yielding of the annular cushion 12 or by slippage of the cushion within the propeller hub. However, if the torque resistance builds up to a value in excess of a predetermined amount, the pin 7 will be sheared, these arrangements being in accordance with conventional practice.

Inasmuch as the shear pin is engaged only in the radial grooves 16 in the forward end of the mounting sleeve 15, the assembly of the propeller and its mounting sleeve can readily be applied to, and removed from, the shaft. For mounting the propeller, it is only necessary that the selected grooves 16 be registered angularly with the pin 7 of the shaft. Thereupon the driving relationship will be maintained during normal operation so long as the propeller assembly is precluded from bodily rearward movement such as to disengage the grooves 16 from the shear pin 7.

In order to maintain this assembly during normal use while permitting instant removal when desired, I employ an annular key 20 mounted for limited transverse sliding movement in a way 21 undercut within the propeller hub, aft of the mounting sleeve 15. The key 20 has an opening 22 sufficiently large to pass the rear end portion 23 of the drive shaft 6. Immediately forward of the portion 23 of the drive shaft, an annular groove 24 provides a shoulder 25 which is engaged by the key 20 whenever the key is displaced laterally with respect to the shaft so that the shaft no longer registers with the opening 22 in the key.

The key is biased toward such a displaced position by a spring 26 seated in a socket 27 in the interior of the hub and acting upon the key through a spring seat plunger 28 which constitutes another seat for the spring.

As a means of moving the key transversely from its normally displaced position toward a position of registry with the shaft, there is a plunger 29 having a push button 30 disposed in the counterbore 31 of the bore 32 in which the plunger is reciprocable. A notch at 33 in the side of the plunger provides spaced shoulders 34 and 35 in which the bridge portion 36 of the key is interlockingly engaged so that the key and plunger move together as a unit in both directions of reciprocation.

When the key is in its normal position of displacement subject to the bias of spring 26, the plunger 30 will desirably be substantially flush with the external surface of the propeller hub 9 as shown in FIG. 1. In this position of the parts, the key will engage the shoulder 25 of propeller shaft 6 to maintain the propeller assembly securely in place on the shaft with its driving sleeve operatively engaged with the shear pin. If the shear pin breaks, the driving connection between the shaft and the propeller will be broken, but the mounting of the propeller assembly on the shaft will remain unchanged.

However, if the operator presses on the push button 30 to displace it and the cylinder 29 inwardly against the compression of the spring 26, the locking key will thereupon be released from engagement with shoulder 25 of the shaft and will be brought into registry with the large aft portion 23 of the shaft, whereupon the propeller assembly may be withdrawn unitarily from the shaft. This facilitates a change of propellers and it also gives immediate access to a shear pin if shear pin replacement is necessary.

While they form no essential part of the invention, suitable seals are desirably provided. O-ring seal 38 encircles plunger 29. A split ring 39 encircles the aft end of the elastomeric cushion 12 to position the bearing disc 40 which confines the aft end of the cushion, and an O-ring seal is desirably provided at 42 on the drive shaft 6. These arrangements tend to exclude water from circulating through that portion of the propeller hub in which the manually operable key 20 is disposed, thus minimizing electrolytic action in salt water.

The pointed terminal portion of the propeller shaft is receivable into the opening of the annular key when the propeller assembly is forced onto the shaft. This cams the key aside, against the bias of its spring, so that manipulation of the push button is not required and assembly is simply a matter of pushing the propeller assembly into position.

I claim:

1. As a quickly detachable connection between a propeller hub member and propeller shaft member, the combination with one of said members provided with a transverse key guideway, of a key confined for movement in the guideway between first and second positions and for which the other of said members has a shoulder, the key being normally engaged with the shoulder in the first key position and being laterally displaceable from such engagement to said second position in which it registers with the shouldered member to accommodate relative axial movement between said members, the key locking said members against such relative movement when engaged with the shoulder.

2. The combination of claim 1 in which the shaft member is provided with the shoulder, the key being provided with a surface extending circumferentially about the shouldered member and of such radius as to clear the shouldered member when displaced from shoulder engaging position.

3. The device of claim 1 in further combination with means biasing the key toward shoulder engaging position, and a push button disposed in a recess with which the hub member is provided, the button being connected with the key and manually operable against said biasing means to move the key from engagement with the shoulder to a position of registry with the shouldered member for releasing said members for relative axial movement.

4. For quickly detachable mounting on a propeller shaft, a propeller assembly which includes a mounting sleeve having a notch at its forward end for which the shaft is provided with a shear pin, said connection comprising a shouldered aft end portion of the shaft, an annular key encircling the shaft and for which the propeller assembly provides a transverse keyway in which the key is laterally movable respecting the shaft, the key having a central opening through which the aft end portion of the shaft is freely receivable when said opening is registered with the shaft, the key normally being engaged with the shoulder to preclude such movement, and means for actuating the key between its position of registry and its position of engagement with said shoulder.

5. The device of claim 4 in which the key actuating means comprises a spring having a seat in the propeller and another seat engaging the key for actuating it in one direction, the key having a push button connected with it for actuating it in opposition to said spring.

6. A propeller assembly for quickly detachable mounting on a propeller shaft provided with a shoulder, said assembly comprising the combination with a propeller hub having a socket to receive the shaft, of means providing a keyway transversely of the hub socket and communicating therewith, a key mounted in the keyway for reciprocation transversely of the socket, said key having a central opening registrable with the socket in one position of the key, and off center respecting the socket in another position of the key, and means for actuating the key between said positions.

7. The device of claim 6 in which said means includes a push button having a connection with the key and having a terminal portion exposed exteriorly of the propeller assembly, the propeller assembly having a bore in which the push button is reciprocable.

8. The device of claim 7 in which said actuating means further includes a spring having two seats, one of which is engaged with the propeller and the other with the key, said spring being connected between said seats to bias the key in opposition to the direction of pressure displacement of the key by the push button.

9. The device of claim 7 in which the push button and the key have parts interlocked for the transmission of motion between the push button and key in both directions of key reciprocation in said keyway.

10. The combination with a propeller shaft having an aft portion provided with a forwardly directed shoulder, said shaft being further provided at a point spaced forwardly of said shoulder with a transverse drive pin, of a propeller having a mounting sleeve telescopically engaged with said shaft and having a forward notch engaged with the pin, said propeller further having a hub encircling said sleeve and an annular elastomeric cushion confined in driving connection between the sleeve and the hub, means providing a keyway transversely of the hub behind the mounting sleeve and in registry with the shoulder, an annular key reciprocable in the keyway to and from engagement with the shoulder, the key having a central opening providing clearance for the aft end of the shaft when the key is disengaged from the shoulder, a spring for which the hub is provided with a socket, said spring constituting means for biasing the key to a position in which it engages said shoulder for locking the hub to the shaft, and a push button having an operating connection with the key and for which the hub is provided with a bore, the push button being exposed externally of the hub for manual operation of said key, the push button constituting means for actuating the key against the bias of said spring to a position for disengaging the key from the shoulder, thereby releasing the propeller assembly from the shaft.

References Cited in the file of this patent

UNITED STATES PATENTS

| | | |
|---|---|---|
| 1,475,257 | Bottone | Nov. 27, 1923 |
| 1,594,084 | Weymann | July 27, 1926 |
| 2,111,245 | Irgens | Mar. 15, 1938 |
| 2,164,485 | Yantis | July 4, 1939 |
| 2,235,605 | Bugatti | Mar. 18, 1941 |
| 2,626,974 | Howard et al. | Jan. 27, 1953 |
| 2,636,362 | Dunn | Apr. 28, 1953 |

FOREIGN PATENTS

| | | |
|---|---|---|
| 736,719 | Great Britain | Sept. 14, 1955 |